United States Patent
Endo et al.

(10) Patent No.: US 9,522,695 B2
(45) Date of Patent: Dec. 20, 2016

(54) STEERING CONTROL DEVICE, AND STEERING CONTROL METHOD

(71) Applicant: Mitsubishi Electric Corporation, Tokyo (JP)

(72) Inventors: Masaya Endo, Tokyo (JP); Yoshihiko Kimpara, Tokyo (JP); Hidetoshi Ikeda, Tokyo (JP); Kenji Ogawa, Tokyo (JP); Taizo Toda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/770,176

(22) PCT Filed: Apr. 8, 2013

(86) PCT No.: PCT/JP2013/060635
§ 371 (c)(1),
(2) Date: Aug. 25, 2015

(87) PCT Pub. No.: WO2014/167630
PCT Pub. Date: Oct. 16, 2014

(65) Prior Publication Data
US 2016/0001811 A1  Jan. 7, 2016

(51) Int. Cl.
*A01B 69/00* (2006.01)
*B62D 5/04* (2006.01)
*B62D 6/02* (2006.01)
*B62D 6/10* (2006.01)
*B62D 15/02* (2006.01)
*B60W 10/20* (2006.01)

(52) U.S. Cl.
CPC .............. *B62D 5/0463* (2013.01); *B62D 6/02* (2013.01); *B62D 6/10* (2013.01); *B60W 10/20* (2013.01); *B62D 15/025* (2013.01)

(58) Field of Classification Search
CPC ........... B62D 15/025; B62D 6/02; B62D 6/10; B62D 5/0463; B60W 10/20; B60W 30/045; B60W 30/09
USPC .................. 701/41, 42, 36, 48; 180/404, 443
See application file for complete search history.

(56) References Cited

U.S. PATENT DOCUMENTS

| 8,565,976 B2 * | 10/2013 | Kojo | ...................... B60T 8/1755 |
| | | | 701/41 |
| 2014/0032051 A1 * | 1/2014 | Ezoe | ...................... B62D 6/001 |
| | | | 701/42 |

FOREIGN PATENT DOCUMENTS

| JP | 10-278829 A | 10/1998 |
| JP | 2000-289639 A | 10/2000 |
| JP | 2002-316659 A | 10/2002 |

OTHER PUBLICATIONS

International Search Report for PCT/JP2013/060635 dated May 28, 2013.

* cited by examiner

*Primary Examiner* — Gertrude Arthur Jeanglaude
(74) *Attorney, Agent, or Firm* — Sughrue Mion, PLLC; Richard C. Turner (57) ABSTRACT

Provided are a steering control device and a steering control method therefor, which reduce a steering feeling of discomfort due to a pulsed change (short abrupt change) in steering assist torque caused when control such as steering wheel return control is turned on/off, and which acquire a sufficient control effect even when high control response is required, by reducing a fluctuation in steering assist torque caused when one steering assist torque is selected from two or more steering assist torques by low-pass filtering, and by correcting the low-pass filtering depending on a change amount of the selected steering assist torque.

11 Claims, 7 Drawing Sheets

STEERING CONTROL DEVICE, AND STEERING CONTROL METHOD

CROSS REFERENCE TO RELATED APPLICATIONS

This application is a National Stage of International Application No. PCT/JP2013/060635 filed Apr. 8, 2013, the contents of all of which are incorporated herein by reference in their entirety.

TECHNICAL FIELD

The present invention relates to a steering control device, and the like, for assisting steering by a driver.

BACKGROUND ART

As a related-art steering control device, there is known a steering control device for generating a steering wheel return torque by a motor in order to improve steering wheel return characteristics at the time when a driver releases a steering wheel from his/her hand at low vehicle speed (for example, Patent Literature 1).

In Patent Literature 1, polarity determination is performed to determine that a steering wheel is in a return state when a rotation direction of a motor and an input direction of a steering torque are different from each other, and whether or not to apply a return torque is selected. In order to prevent the occurrence of a phenomenon that a driver receives a force from the steering wheel in an unintended direction, namely, a so-called unintended steering of the steering wheel, which is caused even when the driver slightly returns the steering wheel in the steering-holding state (in the state in which the driver does not steer the steering wheel greatly during straight travel or the like), whether or not to apply the return torque is selected based on the magnitude of the steering torque. As a result, the return torque becomes a pulsed ON/OFF signal, and steering wheel return control using this signal becomes pulsed control, which is transmitted to the steering wheel as impact caused by an abrupt change in a pulsed short period, thus leading to a feeling of discomfort when the steering of the steering wheel is held or slightly held. Accordingly, to deal with this problem, in Patent Literature 1, it is proposed to subject the return torque to low-pass filtering. Due to the low-pass filtering, the pulsed change in return torque is made gentle to reduce a steering feeling of discomfort.

CITATION LIST

Patent Literature

[PTL 1] JP 10-278829 A (pages 2 and 3, paragraphs 0001 to 0021, and FIG. 2 and FIG. 4)

SUMMARY OF INVENTION

Technical Problem

In the related-art steering control device as described above, the response of the steering wheel return control is limited by the response of the low-pass filter. Accordingly, there is a problem in that, in a situation in which high response of the steering wheel return control is required, a sufficient effect of the steering wheel return control cannot be acquired and appropriate steering wheel return characteristics cannot be acquired.

The present invention has been made in order to solve the problem as described above, and has an object of providing a steering control device and the like, which are capable of reducing a steering feeling of discomfort due to a pulsed change (short abrupt change) in steering assist torque caused when control such as steering wheel return control is turned on/off, and capable of acquiring a sufficient control effect even when high control response is required.

Solution to Problem

According to one embodiment of the present invention, there are provided a steering control device and the like, including: an actuator for applying a steering assist torque to a steering system of a vehicle; a steering state determination section for determining a steering state of a driver; a steering assist torque calculation section for calculating the steering assist torque; a steering assist torque correction section for correcting the steering assist torque depending on a result of the steering state determination section; and an actuator control section for controlling the actuator depending on the corrected steering assist torque, in which the steering assist torque calculation section calculates at least a first steering assist torque, which is to be applied to the actuator in order to improve return characteristics of the steering system, and a second steering assist torque that is smaller than the first steering assist torque, in which the steering assist torque correction section includes: a switch section for selecting and switching, depending on the result of the steering state determination section, one steering assist torque from among at least the first steering assist torque and the second steering assist torque; and a filtering section for suppressing an abrupt change in steering assist torque at a time of the switching, which is caused by a difference between both the steering assist torques, in which the filtering section corrects a change amount of filtering, which is a change amount of a filter output, depending on a change amount of the selected steering assist torque, and in which the actuator control section drives the actuator depending on the steering assist torque corrected by the steering assist torque correction section.

Advantageous Effects of Invention

According to the one embodiment of the present invention, a steering feeling of discomfort due to a pulsed change (short abrupt change) in steering assist torque caused when control such as steering wheel return control is turned on/off may be reduced, and a sufficient control effect may be acquired even when high control response is required.

DESCRIPTION OF EMBODIMENTS

According to the present invention, a fluctuation in steering assist torque caused when one steering assist torque is selected from two or more steering assist torques is reduced by low-pass filtering, and the low-pass filtering is corrected depending on a change amount of the selected steering assist torque, to thereby acquire a sufficient control effect even when high control response is required.

Referring to the drawings, a steering control device and the like according to the present invention are now described by way of embodiments. Note that, the same or corresponding parts in the respective embodiments are denoted by the same reference symbols, and a repetitive description thereof is omitted.

First Embodiment

Figure 1:
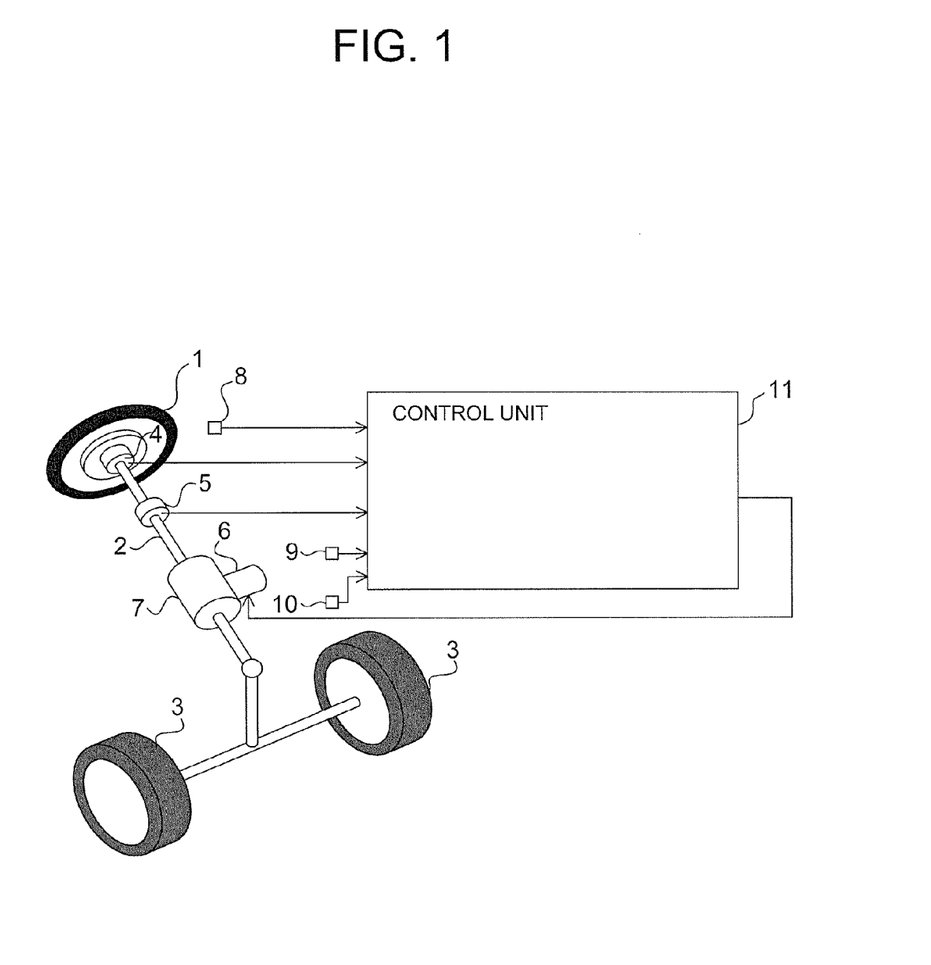
FIG. 1 is a diagram for illustrating an example of a configuration of a steering control device according to the present invention.

FIG. 1 is a diagram for illustrating an example of a configuration of the steering control device according to the present invention. Right and left steered wheels 3 are steered in response to rotation of a steering shaft 2 coupled to a steering wheel 1. A steering angle sensor 4 for detecting a steering angle is mounted to the steering wheel 1. A torque sensor 5 is mounted to the steering shaft 2 to detect a steering torque acting on the steering shaft 2. A motor 6 is coupled to the steering shaft 2 via a speed reduction mechanism 7, and can apply a steering assist torque generated by the motor 6 to the steering shaft 2. A vehicle speed of a vehicle is detected by a vehicle speed sensor 8. A current flowing through the motor 6 is detected by a current sensor 9. An inter-terminal voltage of the motor 6 is detected by a voltage sensor 10.

A control unit 11 calculates, for example, the steering assist torque to be generated by the motor 6, and controls the current of the motor 6 necessary for generating the steering assist torque. The control unit 11 includes a microcomputer (CPU) constructed by memories including a ROM and a RAM to be described later, a current driver 12 for driving the motor current (causing a desired current to flow through the motor 6), and the like.

Next, the calculation of the steering assist torque by the control unit 11, which is a main part, according to this embodiment is described with reference to a block diagram illustrated in FIG. 2 and an operation flowchart illustrated in FIG. 3. Note that, the operation illustrated in the operation flowchart is repeatedly executed at a control cycle of a predetermined period.

Figure 2:
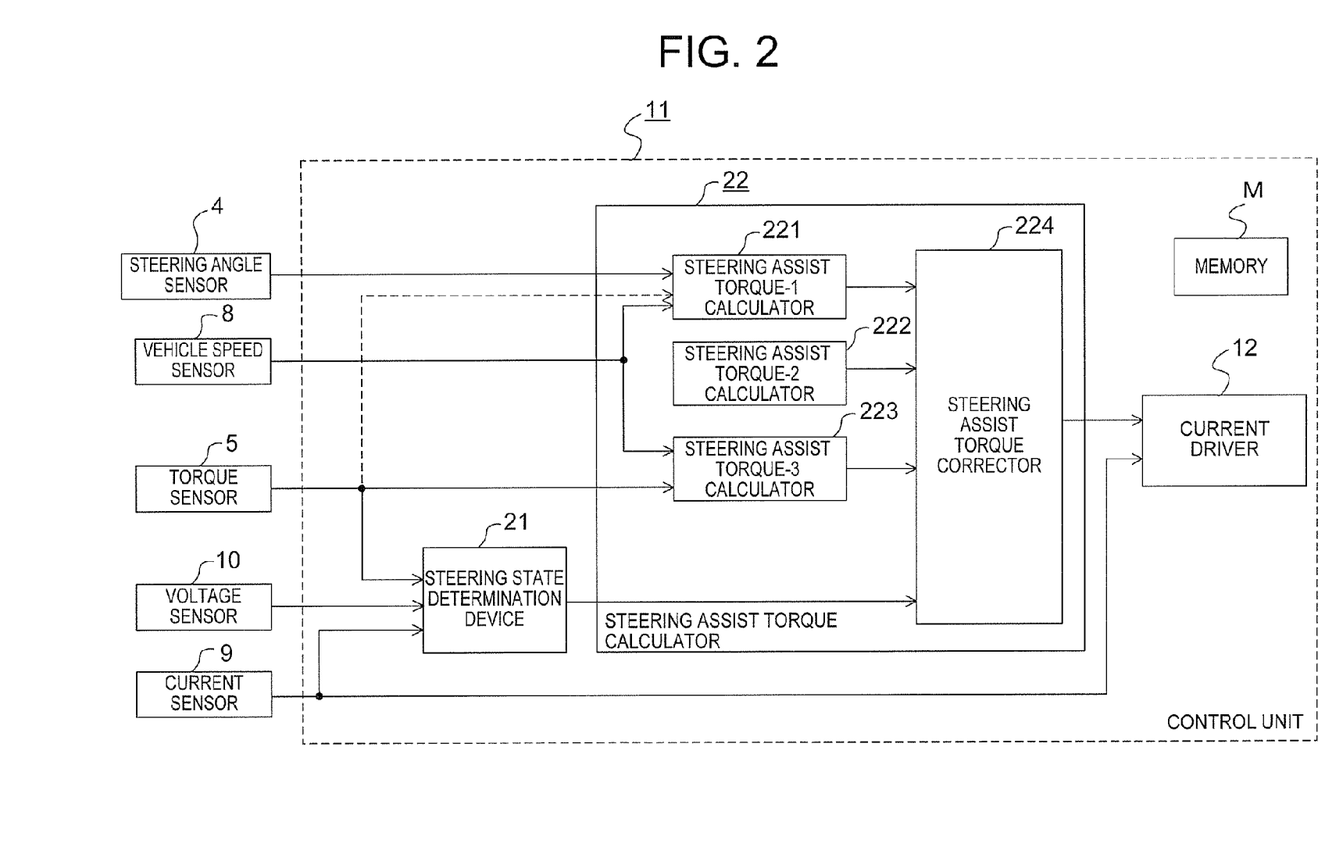
FIG. 2 is a block diagram for illustrating an example of a configuration of a main part of the steering control device according to a first embodiment of the present invention.

In FIG. 2, the control unit 11 includes the current driver 12, a steering state determination device 21 and a steering assist torque calculator 22, which are constructed by the microcomputer, and a memory (device) M. Then, for example, the steering angle sensor 4, the vehicle speed sensor 8, the torque sensor 5, and the current sensor 9 are connected to the control unit 11. In the memory M, various kinds of data and information used by the microcomputer are stored.

The steering assist torque calculator 22 includes a steering assist torque-1 calculator 221, a steering assist torque-2 calculator 222, a steering assist torque-3 calculator 223, and a steering assist torque corrector 224.

Figure 3:
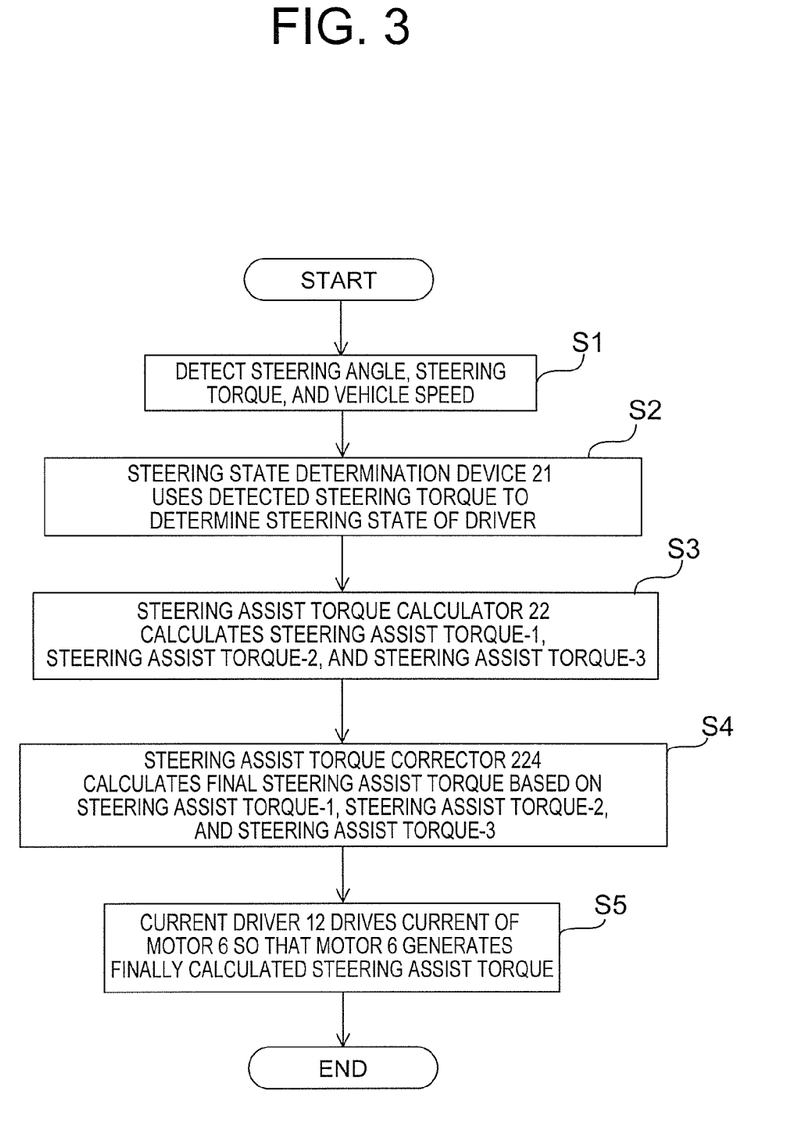
FIG. 3 is an operation flowchart for illustrating an example of an operation of the main part of the steering control device according to the first embodiment of the present invention.

In the operation flowchart of FIG. 3, in Step S1, the steering angle sensor 4, the torque sensor 5, and the vehicle speed sensor 8 are used to detect the steering angle, the steering torque, and the vehicle speed of the vehicle, respectively.

In Step S2, the steering state determination device 21 determines a steering state of a driver based on the steering torque. When the magnitude of the steering torque exceeds a predetermined steering torque threshold, the steering state determination device 21 determines a state in which the driver holds the steering wheel 1 for steering, that is, a steering-holding state.

In Step S3, the steering assist torque calculator 22 calculates a steering assist torque-1, a steering assist torque-2, and a steering assist torque-3 based on the steering angle, the steering torque, and the vehicle speed. In this embodiment, the steering assist torque-1 is a steering assist torque for generating a steering wheel return torque by the motor 6 in order to improve steering wheel return characteristics at the time when the driver releases the steering wheel from his/her hand at low vehicle speed. The configuration of the steering assist torque-1 calculator 221 for calculating the steering assist torque-1 is described.

Figure 4:
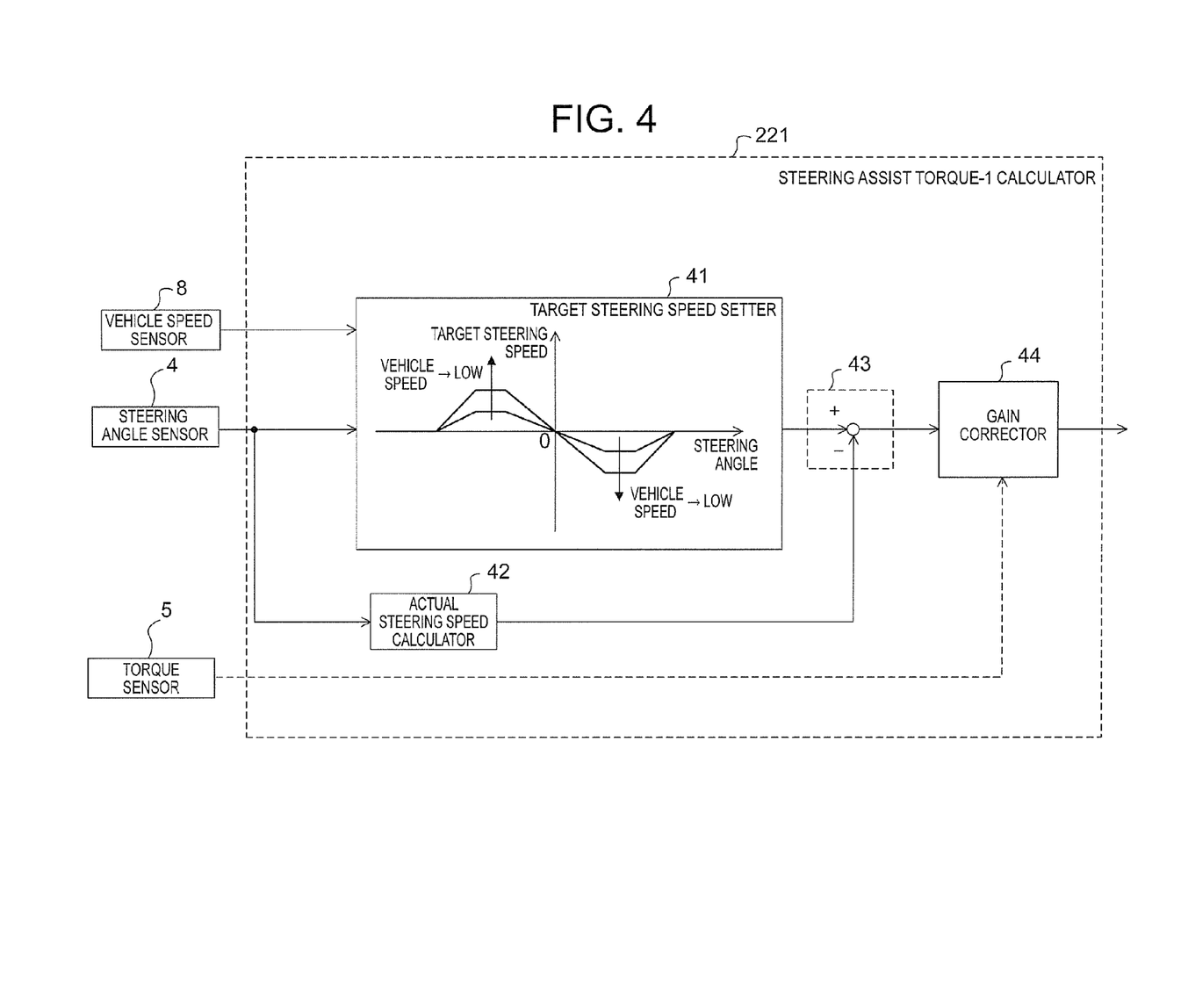
FIG. 4 is a block diagram for illustrating an example of a configuration of a steering assist torque-1 calculator according to the first embodiment of the present invention.

A block diagram of the steering assist torque-1 calculator 221 is illustrated in FIG. 4. In a target steering speed setter 41, a target steering speed corresponding to the steering angle and the vehicle speed is set as map data in advance (stored in the memory in an actual case), and the target steering speed corresponding to the detected steering angle and the detected vehicle speed is calculated. In order to improve the return of the steering wheel 1 to a neutral position, the target steering speed is set to have the sign opposite to that of the steering angle, and is set so that the magnitude of the target steering speed becomes larger as the vehicle speed becomes lower. Then, for example, the target steering speed has such characteristics that, under the same vehicle speed, the target steering speed first increases in the range of steering angles of from zero to, for example, a reference steering angle along with an increase in magnitude (absolute value) of the steering angle, but subsequently decreases after reaching the maximum target steering speed.

An actual steering speed calculator 42 calculates an actual steering speed, which is a steering speed of the steering wheel 1, based on the steering angle.

A subtractor 43 subtracts the actual steering speed from the target steering speed, to thereby calculate a steering speed deviation.

A gain corrector 44 multiplies the steering speed deviation by a predetermined gain, to thereby calculate the steering assist torque-1.

Next, the configuration of the steering assist torque-2 calculator 222 for calculating the steering assist torque-2 is described. In this embodiment, the steering assist torque-2 is a steering assist torque to be switched from the steering assist torque-1 depending on a determination result of the steering state determination device 21, and the steering assist torque-2 is set to be zero. In other words, the steering assist torque-2 is a steering assist torque to be set for stopping the application of the steering assist torque-1.

Note that, for the above-mentioned reason, the steering assist torque-2 is not limited to zero and only needs to be a value smaller than the steering assist torque-1.

The steering assist torque-3 calculator 223 for calculating the steering assist torque-3 calculates a steering assist torque calculated by a related-art steering control device. For example, in this embodiment, a steering assist torque for assisting the steering by the driver corresponding to the steering angle and the vehicle speed is set (stored in the memory M) in advance as map data as exemplified by an assist map shown in FIG. 5, and the steering assist torque-3 is calculated depending on the detected steering torque and the detected vehicle speed.

Figure 5:
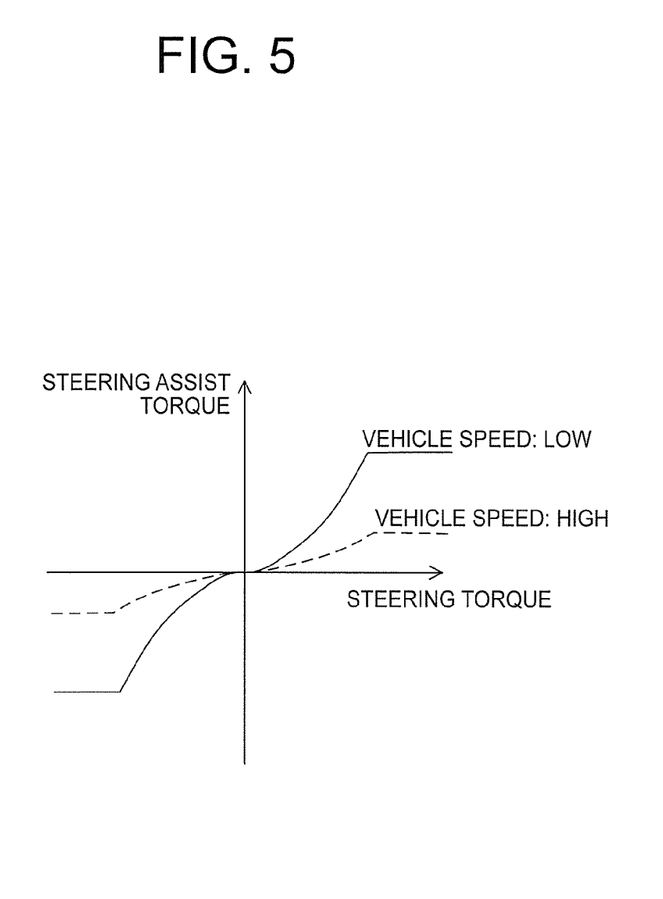
FIG. 5 is a graph for showing an example of an assist map according to the first embodiment of the present invention.

In the assist map of FIG. 5, in a region in which the magnitude (absolute value) of the steering torque is small, the gradient of the assist map, that is, an increase amount of the value of the steering assist torque with respect to an increase in steering torque is small, and the gradient becomes gradually larger as the steering torque increases. When a predetermined steering assist torque is reached, the steering assist torque does not increase any more but becomes constant. The assist map is set so that the magnitude of the steering assist torque becomes larger as the vehicle speed becomes lower.

In Step S4, the steering assist torque corrector 224 calculates a final steering assist torque based on the steering assist torque-1, the steering assist torque-2, and the steering assist torque-3. A block diagram for illustrating the configuration of the steering assist torque corrector 224 is illustrated in FIG. 6.

Figure 6:
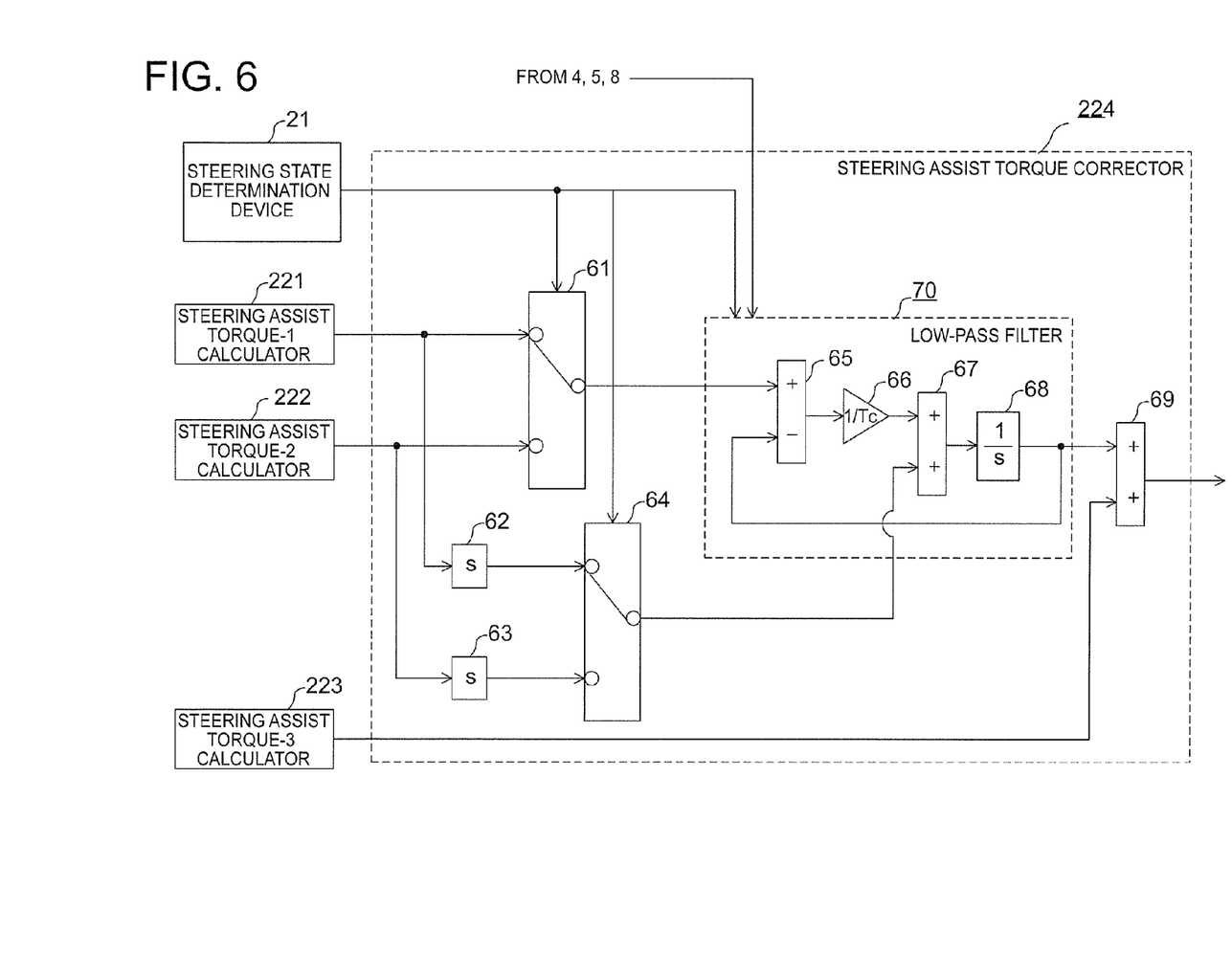
FIG. 6 is a block diagram for illustrating an example of a configuration of a steering assist torque corrector according to the first embodiment of the present invention.

In FIG. 6, the steering assist torque corrector 224 includes differentiators 62 and 63, switches 61 and 64, a low-pass filter 70, and an adder 69. Then, the steering state determination device 21, the steering assist torque-1 calculator 221, the steering assist torque-2 calculator 222, and the steering assist torque-3 calculator 223 are connected to the steering assist torque corrector 224. The low-pass filter 70 includes a subtractor 65, a multiplier 66, an adder 67, and an integrator 68.

The switch 61 switches an output signal depending on a determination result of the steering state determination device 21. In this embodiment, when the steering state determination device 21 determines that the steering-holding state is established, the switch 61 selects the steering assist torque-2 and outputs zero. When the steering state determination device 21 does not determine that the steering-holding state is established, the switch 61 selects and outputs the steering assist torque-1.

The differentiator 62 differentiates the steering assist torque-1 to calculate a change amount of the steering assist torque-1. In FIG. 6, symbol s represents the Laplace operator. The differentiator 63 differentiates the steering assist torque-2 to calculate a change amount of the steering assist torque-2.

The switch 64 switches an output signal depending on the determination result of the steering state determination device 21. In this embodiment, when the steering state determination device 21 determines that the steering-holding state is established, the switch 64 selects and outputs the change amount of the steering assist torque-2. The steering assist torque-2 is zero, and hence the change amount of the steering assist torque-2 is also zero. When the steering state determination device 21 does not determine that the steering-holding state is established, the switch 64 selects and outputs the change amount of the steering assist torque-1.

The subtractor 65 subtracts an output of the integrator 68 from the output of the switch 61, and outputs the resultant.

The multiplier 66 multiplies the output of the subtractor 65 by the reciprocal of a filter time constant Tc, and outputs the resultant. The adder 67 adds the output of the multiplier 66 and the output of the switch 64 together, and outputs the resultant. The integrator 68 integrates the output of the adder 67, and outputs the resultant. The output of the integrator 68 corresponds to a steering assist torque corrected by the steering assist torque corrector 224, which is a main part of this embodiment.

The adder 69 adds the output of the integrator 68 and the steering assist torque-3 together, and outputs the final steering assist torque.

Now, a correspondence to the configuration in the related-art in which the steering assist torque is simply subjected to low-pass filtering is described. A low-pass filter in the related art corresponds to a configuration obtained by excluding the adder 67 from the broken-line section 70 of FIG. 6. In the low-pass filter in the related art, the input to the integrator 68, that is, the output of the multiplier 66 corresponds to a change amount of an output signal of the low-pass filter. Accordingly, the input to the integrator 68, that is, the output of the multiplier 66 is referred to as "change amount of filtering".

In Step S5, the current driver 12 drives the current of the motor 6 so that the motor 6 generates the finally calculated steering assist torque.

Note that, the current driver 12 generally performs feedback control based on a current value of the motor 6 supplied from the current sensor 9, but the present invention is not limited thereto.

Figure 7:
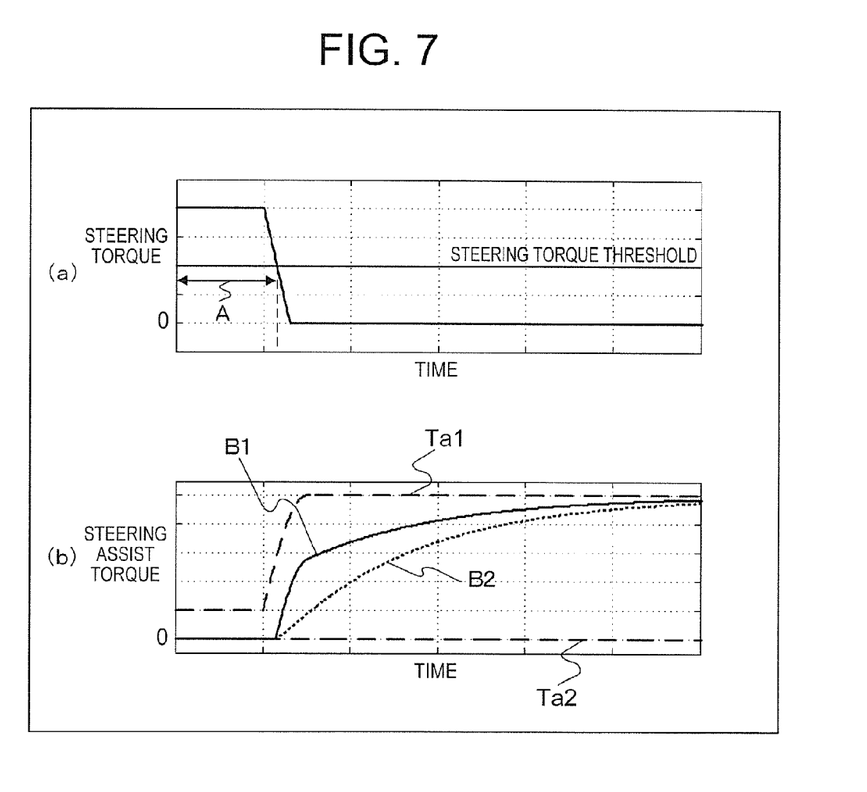
FIG. 7 is a graph for showing an effect of the steering control device according to the present invention.

Next, an effect of this embodiment is described. A great difference between this embodiment and the related art resides in that the adder 67 is added to the low-pass filtering indicated by the broken-line section 70 so as to provide processing of correcting the change amount of filtering by adding the change amount of the steering assist torque selected by the switch 61. The effect thereof is shown in FIG. 7. In FIG. 7, the output of the integrator 68 is shown on the assumption that the driver releases the steering wheel 1 from his/her hands in a region in which the steering angle is large.

In part (a) of FIG. 7, a temporal change in steering torque is shown, and symbol A represents the period during which the steering-holding state is determined to be established. In part (b) of FIG. 7, a temporal change in calculated steering assist torque is shown, and symbol B1 represents a steering assist torque obtained by the processing of the low-pass filter in the present invention, symbol B2 represents a steering assist torque obtained by the processing of the related-art low-pass filter, symbol Ta1 represents the steering assist torque-1, and symbol Ta2 represents the steering assist torque-2.

In the case where the driver releases the steering wheel 1 from his/her hand in the region in which the steering angle is large, a road surface reaction torque acting to return the steering wheel 1 to the neutral position is large, and hence an actual speed of returning the steering wheel 1 to the neutral position, which is higher than the target steering speed, is generated. As a result, the steering wheel 1 abruptly returns to the neutral position, and hence the driver feels discomfort. In order to reduce the feeling of discomfort, it is preferred that the steering wheel 1 return appropriately slowly.

The steering assist torque-1 calculator 221 calculates the steering assist torque based on the deviation between the target steering speed and the actual steering speed, and hence when the actual steering speed is higher than the target steering speed, the steering assist torque-1 is calculated so that the actual steering speed is suppressed to slowly return the steering wheel 1.

The steering assist torque-1 (Ta1) in part (b) of FIG. 7 shows that the steering assist torque for suppressing the actual steering speed is increased when the driver releases the steering wheel 1 from his/her hand. The steering assist torque-2 (Ta2) is always zero. As shown in part (a) of FIG. 7, in the period (A) during which the steering torque exceeds the steering torque threshold and the steering-holding state is determined to be established, the steering assist torque-2 (Ta2) is selected. When the steering torque falls below the steering torque threshold, the steering assist torque-1 (Ta1) is selected.

At the timing of switching of the steering assist torque, the steering assist torque-1 (Ta1) and the steering assist torque-2 (Ta2) have different values. Accordingly, if the steering assist torque is simply switched in a manner exemplified by a switch, an abrupt change in steering assist torque caused by a difference between both the steering assist torques makes even the driver feel discomfort. This feeling of discomfort corresponds to impact caused by the pulsed change by the pulsed abrupt change disclosed in Patent Literature 1.

With the steering assist torque B2 in part (b) of FIG. 7 obtained by the processing of the low-pass filter in the related art, an offset abrupt change caused by the difference between both the steering assist torques is suppressed to be a gradual change, and hence the feeling of discomfort is suppressed. However, the response is delayed due to the low-pass filter, with the result that the rise of the steering assist torque-1 for suppressing an abrupt return speed of the steering wheel 1 is delayed. As a result, there arises a problem in that the abrupt return speed of the steering wheel 1 may be generated to give the driver a feeling of discomfort.

On the other hand, the steering assist torque B1 in part (b) of FIG. 7 obtained by the processing of the low-pass filter in the present invention shows the output of the integrator 68 according to this embodiment. As a result of correcting the filtering so that the change amount of the selected steering assist torque-1 is added to the output of the multiplier 66 in the adder 67, the offset abrupt change at the timing of switching of the steering assist torque is prevented so that the steering assist torque is switched smoothly, and after the switching, the output of the integrator 68 changes in the same manner as the change in steering assist torque-1. In other words, the response delay is suppressed, and the steering assist torque rises earlier than in the related art. Consequently, the steering assist torque for suppressing the abrupt return speed of the steering wheel 1 can be generated at an early point, thereby being capable of returning the steering wheel 1 slowly and appropriately.

The above-mentioned effect is described in view of transmission characteristics. Transmission characteristics of the related-art low-pass filter are determined by transmission characteristics of the low-pass filter, but the present invention has an effect that the transmission characteristics are 1 and hence change characteristics of the input become the change in output with no delay. Then, in regard to the offset caused at the time of switching, there is an effect that the offset is smoothly canceled due to the transmission characteristics of the low-pass filter.

Note that, this embodiment has been described on the assumption that the filter time constant is a fixed value, but the filter time constant Tc may be varied as described below.

For example, the filter time constant Tc is changed depending on the switching of the switches 61 and 64, that is, based on a determination result of the steering state determination device 21. In the case where the steering assist torque-2 is selected by the switches 61 and 64 in order to stop the application of the steering assist torque-1, the abrupt return speed of the steering wheel 1 need not be dealt with and hence high responsiveness is not required. Accordingly, by setting the time constant large, the steering assist torque can be more gradually decreased to be zero to achieve a smooth steering feeling.

Thus, the multiplier 66 may have a function of changing the filter time constant Tc based on at least one kind of external signal representing a predetermined condition, and a predetermined calculation function, such as determining the steering speed based on, for example, a change in steering angle (see FIG. 6). As a map of the filter time constant Tc corresponding to each condition, a threshold for changing the time constant, or the like, for example, those stored in the memory M in advance are used (the same applies hereinafter).

Also in a situation in which the switches 61 and 64 are not switched, that is, when the determination result of the steering state determination device 21 remains unchanged, the filter time constant may be varied. In a situation in which the steering-holding state is determined to be established and the steering assist torque-2 is selected, when the steering speed determined based on, for example, a change in steering angle detected by the steering angle sensor 4 is higher than a predetermined steering speed threshold, the filter time constant is set small.

With this configuration, an appropriate control response of the steering assist torque corrector 224 can be acquired depending on the steering speed. Consequently, when it is determined that the steering-holding state in which the driver holds the steering wheel 1 is established and when the driver steers the steering wheel 1, the steering assist torque can be gradually decreased to be zero in a rapid manner, and hence the interference between the steering by the driver and the steering assist torque can be suppressed. In contrast, when the driver holds the steering of the steering wheel at a constant steering angle, the steering assist torque is gradually decreased to be zero in a slow manner, and hence a feeling of discomfort due to a change in steering assist torque can be reduced.

Also in a situation in which the steering torque is small but the steering-holding state is not determined to be established and the steering assist torque-1 is selected, the time constant may be changed so as to be large when the steering speed is low. In a situation in which the driver holds the steering of the steering wheel 1 even with a small steering torque, an offset abrupt change at the timing of switching of the steering assist torque can be further suppressed, and a feeling of discomfort due to a change in steering assist torque can be reduced. By setting the steering speed threshold to be a sufficiently low steering speed, when the driver releases the steering wheel 1 from his/her hand at a large steering angle, the time constant is immediately changed to a small value. Consequently, the effect of suppressing the abrupt return speed of the steering wheel 1 can be similarly acquired.

Alternatively, the filter time constant may be changed depending on the vehicle speed. In this case, the multiplier 66 changes the filter time constant based on a vehicle speed signal from the vehicle speed sensor 8. With this configuration, an appropriate control response of the steering assist torque corrector 224 can be acquired depending on the vehicle speed. In the case where the vehicle speed is low, the road surface reaction torque is small, and hence even when the driver releases the steering wheel 1 from his/her hand at a large steering angle, the return speed of the steering wheel 1 is gentle. Accordingly, by setting the time constant so as to become larger as the vehicle speed becomes lower, a pulsed change in steering assist torque can be made smoother, thereby being capable of acquiring a smooth steering feeling.

Alternatively, the filter time constant may be changed depending on the steering torque. In this case, the multiplier 66 changes the filter time constant based on a determination result of the steering state determination device 21 and a torque signal from the torque sensor 5. With this configuration, an appropriate control response of the steering assist torque corrector 224 can be acquired depending on the steering torque. For example, in a situation in which the steering state determination device 21 determines that the steering-holding state is established and the application of the steering assist torque-1 is stopped, that is, a situation in which the steering assist torque-2 is selected, the time constant is set smaller as the magnitude of the steering torque becomes larger. Consequently, in a situation in which the driver steers the steering wheel 1 and the steering torque is increasing, the offset of the steering assist torques can be gradually decreased to be zero in a rapid manner, and hence when the steering assist torque-2 is selected by the switches 61 and 64, the interference between the steering by the driver and the steering assist torque can be suppressed.

Note that, in the above-mentioned embodiment, the steering angle sensor 4 is used to acquire the steering angle and the steering speed, but the present invention is not limited thereto. It should be understood that a rotation angle of the motor 6 can be used as the steering angle, and a steering angle estimated based on a wheel speed difference may be used. As the steering speed, a steering speed estimated based on a voltage detected by the voltage sensor 10 may also be used.

In the above-mentioned embodiment, the steering state determination device 21 is configured to determine, based on the magnitude of the steering torque, the steering-holding state in which the driver holds the steering of the steering wheel 1, but the present invention is not limited thereto. For example, as disclosed in Patent Literature 1, the steering state determination device 21 is configured to determine that, when a rotation direction of the motor and a direction of the steering torque are different from each other, the driver performs return steering of returning the steering wheel 1 to the neutral position, and to select the steering assist torque-1. When it is not determined that the return steering is performed, the steering assist torque-2 of zero is selected. With this configuration, the return torque is not applied in the additional steering, and hence an increase in driver's steering torque can be prevented. Then, in the return steering, the return torque for returning the steering wheel 1 to the neutral position can be applied to assist the return steering. Then, the offset change at the time of switching of the steering assist torque can be made gentle to prevent a driver's feeling of discomfort, and also in the return steering that needs high response, the control effect can be acquired by taking the change amount of the steering assist torque into consideration.

Note that, the rotation direction of the motor can be determined based on, for example, an output signal from the voltage sensor 10 or the current sensor 9 (see FIG. 2).

Further, in the above-mentioned embodiment, the steering assist torque-2 is set to be zero, but the present invention is not limited to this configuration. For example, the steering assist torque-1 calculator 221 in which a predetermined gain to be multiplied by the deviation by the gain corrector 44 of FIG. 4 is smaller than that when the steering assist torque-1 is calculated is used for the calculation of the steering assist torque-2. In other words, with this configuration, the steering assist torque-2 that is not zero but is smaller than the steering assist torque-1 can be acquired, and the control effect can be weakened depending on the result of steering state determination, thereby being capable of suppressing the interference between the steering by the driver and the steering assist torque.

In this case, for example, in FIG. 4, the steering assist torque-2 calculator 222 has the same configuration as that of the steering assist torque-1 calculator 221 except that the gain in the gain corrector 44 is smaller.

The steering assist torque-1, the steering assist torque-2, and a steering assist torque having an intermediate value therebetween may be calculated, and one steering assist torque may be selected therefrom depending on the magnitude of the steering torque. Consequently, a more appropriate steering assist torque can be selected depending on the steering state of the driver, and an appropriate steering assist torque can be acquired.

In this case, as shown in FIG. 2 and FIG. 4, for example, the gain corrector 44 of the steering assist torque-1 calculator 221 is configured to change or switch the gain based on the steering torque acquired from the torque sensor 5.

Further, in the above-mentioned embodiment, the steering assist torque-1, which is a steering assist torque for generating the steering wheel return torque by the motor 6 in order to improve the steering wheel return characteristics at the time when the driver releases the steering wheel from his/her hand at low vehicle speed, is calculated based on the deviation between the target steering speed and the steering speed, but the present invention is not limited to this configuration.

Figure 8:
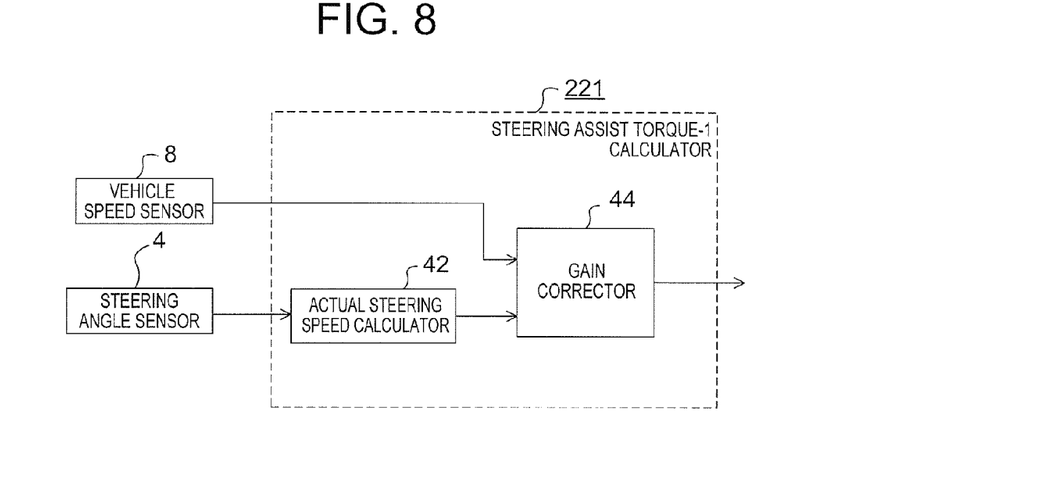
FIG. 8 is a block diagram for illustrating another example of the configuration of the steering assist torque-1 calculator according to the first embodiment of the present invention.

For example, a viscous torque serving as a resistive torque proportional to the steering speed may be applied as the steering assist torque in order to improve the return characteristics of the steering wheel 1 in a manner that a relatively small viscous torque is applied in the additional steering and a relatively large viscous torque is applied in the return steering. A block diagram for illustrating the configuration of the steering assist torque-1 calculator 221 in the case where the viscous torque is used as the steering assist torque is illustrated in FIG. 8. The actual steering speed calculator 42 differentiates the steering angle acquired from the steering angle sensor 4 to calculate the actual steering speed. The gain corrector 44 sets a gain depending on the vehicle speed detected by the vehicle speed sensor 8, and multiplies the actual steering speed by the set gain to calculate the viscous torque, to thereby determine the steering assist torque-1. The steering assist torque-1 is multiplied by a gain of less than 1, to thereby calculate the steering assist torque-2. The steering state determination device 21 determines whether the steering state is the additional steering state or the return steering state. The steering assist torque-2 is selected in the additional steering state, and the steering assist torque-1 is selected in the return steering state.

With this configuration, in the additional steering, the viscous torque can be set small, and hence an increase in driver's steering torque can be prevented to acquire an appropriate steering feeling, and the offset change at the time of switching of the steering assist torque can be made gentle to prevent a driver's feeling of discomfort. Besides, in the return steering, an abrupt increase in return speed can be suppressed due to high control response.

Note that, the motor 6 and the speed reduction mechanism 7 serve as an actuator, the steering state determination device 21 serves as a steering state determination section, the steering assist torque-1 calculator 221, the steering assist torque-2 calculator 222, and the steering assist torque-3 calculator 223 serve as a steering assist torque calculation section, the steering assist torque corrector 224 serves as a steering assist torque correction section, the current driver 12 serves as an actuator control section, the switches 61 and 64 serve as a switch section, and the differentiators 62 and 63, the low-pass filter 70 (including the subtractor 65, the multiplier 66, the adder 67, and the integrator 68), and the adder 69 serve as a filtering section.

The steering angle sensor 4 (or the steering angle sensor 4 and the multiplier 66) serves as a steering angle detection section, the vehicle speed sensor 8 serves as a vehicle speed detection section, and the torque sensor 5 serves as a steering torque detection section.

The steering assist torque-1 serves as a first steering assist torque, the steering assist torque-2 serves as a second steering assist torque, and the steering assist torque-3 serves as a reference steering assist torque.

The present invention is not intended to be limited to the above-mentioned embodiments, and it should be understood that the present invention includes all possible combinations of the embodiments.

INDUSTRIAL APPLICABILITY

The steering control device and the like according to the present invention are applicable to various kinds of steering devices, and similar effects are obtained.

REFERENCE SIGNS LIST 1 steering wheel, 2 steering shaft, 3 steered wheel, 4 steering angle sensor, 5 torque sensor, 6 motor, 7 speed reduction mechanism, 8 vehicle speed sensor, 9 current sensor, 10 voltage sensor, 11 control unit, 12 current driver, 21 steering state determination device, 22 steering assist torque calculator, 41 target steering speed setter, 42 actual steering speed calculator, 43 subtractor, 44 gain corrector, 61, 64 switch, 62, 63 differentiator, 65 subtractor, 66 multiplier, 67 adder, 68 integrator, 69 adder, 70 low-pass filter, 221 steering assist torque-1 calculator, 222 steering assist torque-2 calculator, 223 steering assist torque-3 calculator, 224 steering assist torque corrector, M memory

The invention claimed is:

1. A steering control device, comprising:
an actuator for applying a steering assist torque to a steering system of a vehicle;
a steering state determination section for determining a steering state of a driver;
a steering assist torque calculation section for calculating the steering assist torque;
a steering assist torque correction section for correcting the steering assist torque depending on a result of the steering state determination section; and
an actuator control section for controlling the actuator depending on the corrected steering assist torque,
wherein the steering assist torque calculation section calculates at least a first steering assist torque, which is to be applied to the actuator in order to improve return characteristics of the steering system, and a second steering assist torque that is smaller than the first steering assist torque,
wherein the steering assist torque correction section comprises:
a switch section for selecting and switching, depending on the result of the steering state determination section, one steering assist torque from among at least the first steering assist torque and the second steering assist torque; and
a filtering section for suppressing an abrupt change in steering assist torque at a time of the switching, which is caused by a difference between both the steering assist torques,
wherein the filtering section corrects a change amount of filtering, which is a change amount of a filter output, depending on a change amount of the selected steering assist torque, and
wherein the actuator control section drives the actuator depending on the steering assist torque corrected by the steering assist torque correction section.

2. The steering control device according to claim 1, wherein the steering assist torque correction section changes a time constant of the filtering depending on the result of the steering state determination section.

3. The steering control device according to claim 1, further comprising a steering speed detection section for detecting a steering speed of the steering system,
wherein the steering assist torque correction section changes a time constant of the filtering depending on the steering speed.

4. The steering control device according to claim 1, further comprising a vehicle speed detection section for detecting a vehicle speed of the vehicle,
wherein the steering assist torque correction section changes a time constant of the filtering depending on the vehicle speed.

5. The steering control device according to claim 1, further comprising a steering torque detection section for detecting a steering torque acting on the steering system of the vehicle,
wherein the steering assist torque correction section changes a time constant of the filtering depending on the steering torque.

6. The steering control device according to claim 1,
wherein the steering assist torque calculation section calculates a reference steering assist torque, which is determined based on a steering torque and a vehicle speed; and
wherein the steering assist torque correction section outputs a steering assist torque obtained by correcting the reference steering assist torque with the steering assist torque output from the filtering section.

7. A steering control method, comprising the steps of:
determining a steering state of a driver;
calculating a steering assist torque;
correcting the steering assist torque depending on a result of the steering state determination; and
controlling, based on the corrected steering assist torque, an actuator for applying the steering assist torque to a steering system of a vehicle,
wherein the step of calculating a steering assist torque comprises calculating at least a first steering assist torque, which is to be applied to the actuator in order to improve return characteristics of the steering system, and a second steering assist torque that is smaller than the first steering assist torque,
wherein the step of correcting the steering assist torque comprises selecting and switching, depending on the result of the steering state determination, one steering assist torque from among at least the first steering assist torque and the second steering assist torque, and performing filtering for suppressing an abrupt change in steering assist torque at a time of the switching, which is caused by a difference between both the steering assist torques, wherein the filtering corrects a change amount of the filtering, which is a change amount of a filter output, depending on a change amount of the selected steering assist torque, and wherein the step of controlling the actuator comprises driving the actuator depending on the steering assist torque corrected in the step of correcting the steering assist torque.

8. The steering control device according to claim 2, wherein the steering assist torque calculation section calculates a reference steering assist torque, which is determined based on a steering torque and a vehicle speed; and wherein the steering assist torque correction section outputs a steering assist torque obtained by correcting the reference steering assist torque with the steering assist torque output from the filtering section.

9. The steering control device according to claim 3, wherein the steering assist torque calculation section calculates a reference steering assist torque, which is determined based on a steering torque and a vehicle speed; and wherein the steering assist torque correction section outputs a steering assist torque obtained by correcting the reference steering assist torque with the steering assist torque output from the filtering section.

10. The steering control device according to claim 4, wherein the steering assist torque calculation section calculates a reference steering assist torque, which is determined based on a steering torque and a vehicle speed; and wherein the steering assist torque correction section outputs a steering assist torque obtained by correcting the reference steering assist torque with the steering assist torque output from the filtering section.

11. The steering control device according to claim 5, wherein the steering assist torque calculation section calculates a reference steering assist torque, which is determined based on a steering torque and a vehicle speed; and wherein the steering assist torque correction section outputs a steering assist torque obtained by correcting the reference steering assist torque with the steering assist torque output from the filtering section.

* * * * *